May 20, 1941.     D. WIDESS     2,242,735
LOCATION INDICATOR FOR MAPS
Filed Oct. 21, 1940
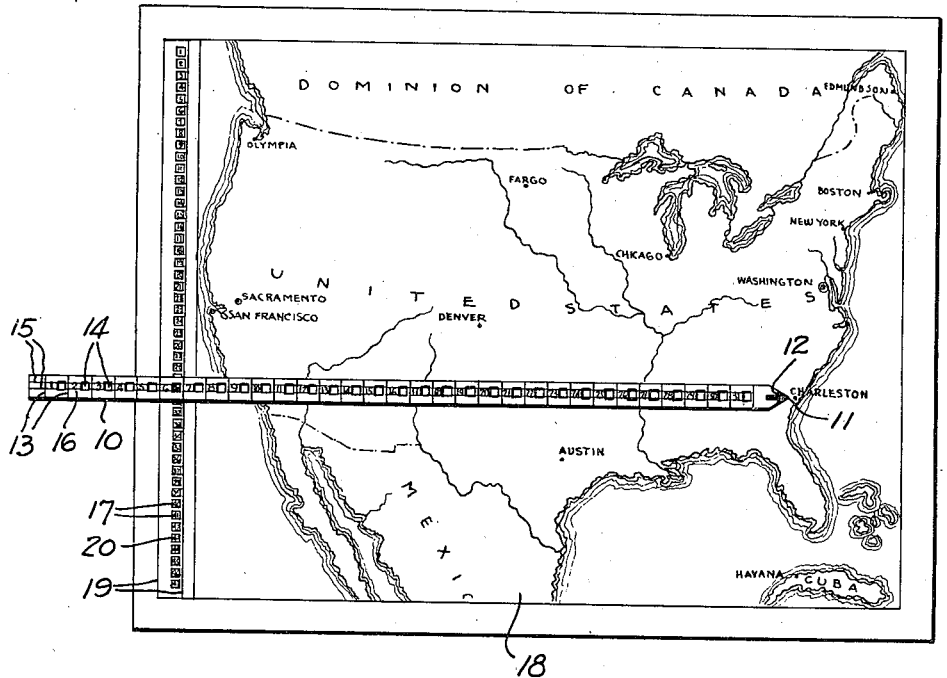
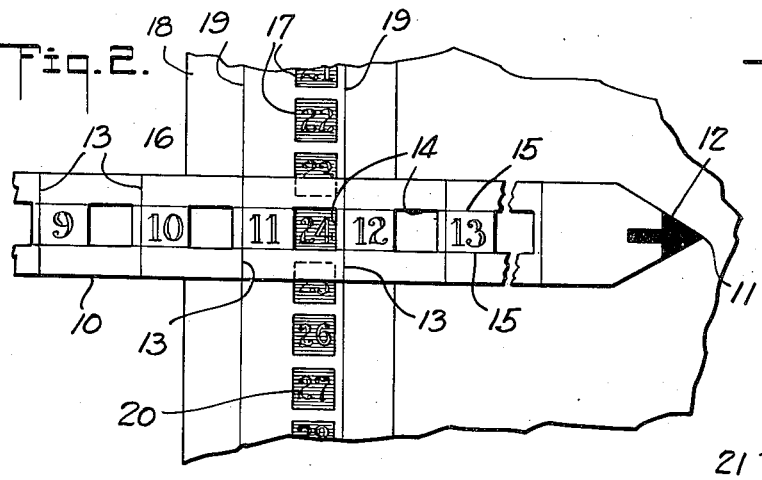
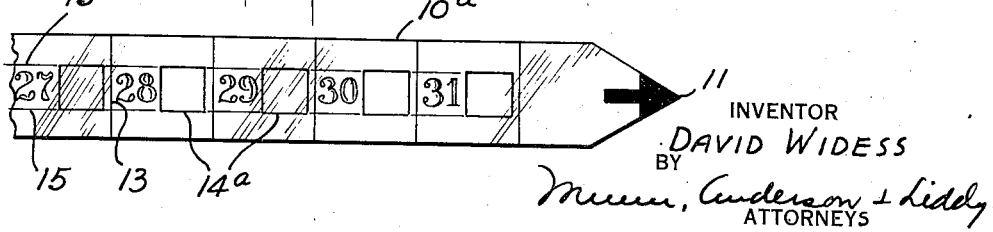
INVENTOR
DAVID WIDESS
BY
ATTORNEYS Patented May 20, 1941

2,242,735

UNITED STATES PATENT OFFICE 2,242,735

LOCATION INDICATOR FOR MAPS

David Widess, Pasadena, Calif.

Application October 21, 1940, Serial No. 361,999

5 Claims. (Cl. 33—76)

This invention relates generally to geography, and more particularly to geographical and astronomical maps and charts.

An object of the invention is to provide a device which, in its operative association with a map or chart, enables various places on the map listed in an index composed of names of places on the map and two key characters, such as numbers for each name, to be located accurately on the map with the utmost ease and dispatch by correlating one of such characters on the map with one of the characters on the device, whereby to greatly simplify and facilitate the use of the map.

Another object of the invention is to provide a location indicator for maps embodying an elongated indicating member having suitable numbered graduations at predetermined intervals along its length, and observation openings correlated with the graduations for co-action with a column or row of suitably numbered areas provided on a map along a side thereof, in accurately indicating various places on the map upon registering such areas in the openings and alining one or more of the graduations with a guide line or lines also provided on the map along said side thereof, all in conjunction with the index list of places on the map and the key numbers associated therewith.

With these and other objects in view, the invention resides in the combinations and arrangements of elements set forth in the following specification and particularly pointed out in the appended claims.

In the accompanying drawing,

Figure 1 is a view of the indicating member in front elevation applied to a map for co-action therewith in indicating a certain place on the map in accordance with the key characters of such place in an index list of all places on the map;

Figure 2 is an enlarged fragmentary face view of a portion of the indicating member and map;

Figure 3 is a fragmentary view of the index of places on a map with which the indicating member is to be used;

Figure 4 is an enlarged fragmentary face view of a modified form of indicating member.

Referring specifically to the drawing, and particularly to Figures 1, 2 and 3, the invention in its present embodiment comprises an indicating member 10 which can be in the form of a rectilinear strip of metal, cardboard, fabric tape, transparent plastic or other suitable rigid or flexible material having one end double beveled to provide an indicating extremity or point 11 with which is associated an indicating arrow 12 printed or otherwise formed on the face of the member. At predetermined equal distances along the length of the member are transverse graduations 13 with each of which is associated an observation opening 14. Each opening is preferably square in outline with two sides thereof parallel to the longitudinal edges of the member. The member is provided with two longitudinally extending guide lines 15, the spacing of which corresponds to the length of a side of the openings 14. It will be noted that the guide lines 15 are disposed on the member so that if continued at the openings 14 the guide lines would be alined with those sides of the openings which are parallel to the longitudinal edges of the member.

As indicated at 16, the observation openings 14 are numbered consecutively from 1, starting from the end of the member opposite its indicating extremity 11, for co-action with areas 17 on a map 18 with which the member 10 is to be used.

The areas 17 are square in outline with their sides parallel to the sides of the map, and of a length corresponding to the spacing of the guide lines 15 on the member 10. The areas 17 are arranged in a column or row along one side or border of the map between guide lines 19 spaced to correspond with the spacing of the graduations 13, the relation of the areas to the guide lines 19 being such that when the member is applied to the map and any two of the graduations 13 are alined with the guide lines 19, and the guide lines 15 are alined with two sides of the respective one of the areas 17, such area will be exactly centered in that one of the openings 14 between the two said graduations 13, all to the end of insuring the positioning of the member 10 at a right angle to the guide lines 19. As indicated at 20, the areas 17 are numbered consecutively beginning with number 1 from one end of the column or row of the areas.

The spacings of the openings 14 and of the areas 17 are such that when the member 10 is applied to the map as aforestated, the city, town, street or other place on the map appearing immediately beyond the indicating extremity 11 of the member will correspond to such place in the index list of places, with which is associated the two key numbers corresponding to those on the member and map which are utilized in determining the longitudinal and transverse positioning of the member on the map. Thus, by consulting the index list 21 (Figure 3) for any place which it is desired to locate on the map, and utilizing the two key numbers associated with the names of such place on the list to adjust the member with respect to the map, the place being sought will be located in proximity to the indicating extremity 11 of the member on the map. The guide lines 15 and 19 effectively co-act with the areas 17 and graduations 13, respectively, in enabling the member 10 to readily be "squared" with the sides of the map to insure an accurate indication by the member 10. In addition, the spacing of the graduations 13 are such as to represent a definite distance on the map in accordance with the scale at which the latter is drawn, so that the member can be used to measure distances on the map.

Reference will now be had to Figure 4, which illustrates a slightly modified form of indicating member 10a which is constructed of transparent material such as glass or plastics and differs from the member 10 in omitting the square openings 14 and substituting therefor scribed square areas 14a of the same dimensions as the openings for co-action with the map areas 17 in the identical manner above described.

What is claimed is:

1. In a location indicator for maps having key index character bearing areas arranged in row formation along the length of guide lines extending in parallelism along a side border of the map, an elongated rectilinear member having an indicating extremity and transverse graduations spaced to correspond with the spacing of the guide lines on the map for alinement therewith to establish a squared and longitudinally adjusted position of the member with respect to the map; the member having observation openings and key index characters associated therewith and with said graduations for co-action with the areas of the map in establishing a transversely adjusted position of the member when one of the areas is centered in one of said openings.

2. In a location indicator for maps having key index character bearing areas arranged in row formation along the length of guide lines extending in parallelism along a side border of the map, an elongated rectilinear member having an indicating extremity and transverse graduations spaced to correspond with the spacing of the guide lines on the map for alinement therewith to establish a squared and longitudinally adjusted position of the member with respect to the map; the member having observation openings and key index characters associated therewith and with said graduations for co-action with the areas of the map in establishing a transversely adjusted position of the member when one of the areas is centered in one of said openings; the member having parallel guide lines extending longitudinally thereof and adapted to be alined with sides of any one of said areas to aid in establishing a squared position of the member relative to the map.

3. In a location indicator for maps having key index character bearing areas arranged in row formation and guide lines extending along a side border of the map, a member having an indicating portion and a multiplicity of observation openings at intervals along its length; the member having key index characters associated with said openings for co-action with the characters of said areas; the member having guide lines adapted to be alined with the guide lines of the map longitudinally and transversely of the member to establish a squared position of the member relative to the map.

4. In a location indicator for maps having key index character bearing areas arranged in row formation along the length of guide lines extending in parallelism along a side border of the map, an elongated rectilinear member having an indicating extremity and transverse graduations spaced to correspond with the spacing of the guide lines on the map for alinement therewith to establish a squared and longitudinally adjusted position of the member with respect to the map; the member having means and key index characters associated therewith and with said graduations for co-action with the areas of the map in establishing a transversely adjusted position of the member when one of the areas is centered in one of said openings.

5. In a location indicator for maps having key index character bearing areas arranged in row formation along the length of guide lines extending in parallelism along a side border of the map, an elongated rectilinear member of transparent material having an indicating extremity and transverse graduations spaced to correspond with the spacing of the guide lines on the map for alinement therewith to establish a squared and longitudinally adjusted position of the member with respect to the map; the member having squared areas and key index characters associated therewith and with said graduations for co-action with said areas of the map in establishing a transversely adjusted position of the member when one of the map areas is centered with respect to one of said areas of the member.

DAVID WIDESS.